3,368,175
VOLTAGE LEAD ENTRANCE FOR ENCAPSULATED ELECTRICAL DEVICES
Bertrand V. Giegerich, Charles H. Bliss, and Frank S. Nichols, Pittsfield, Mass., assignors to General Electric Company, a corporation of New York
Filed Apr. 8, 1966, Ser. No. 541,332
2 Claims. (Cl. 336—84)

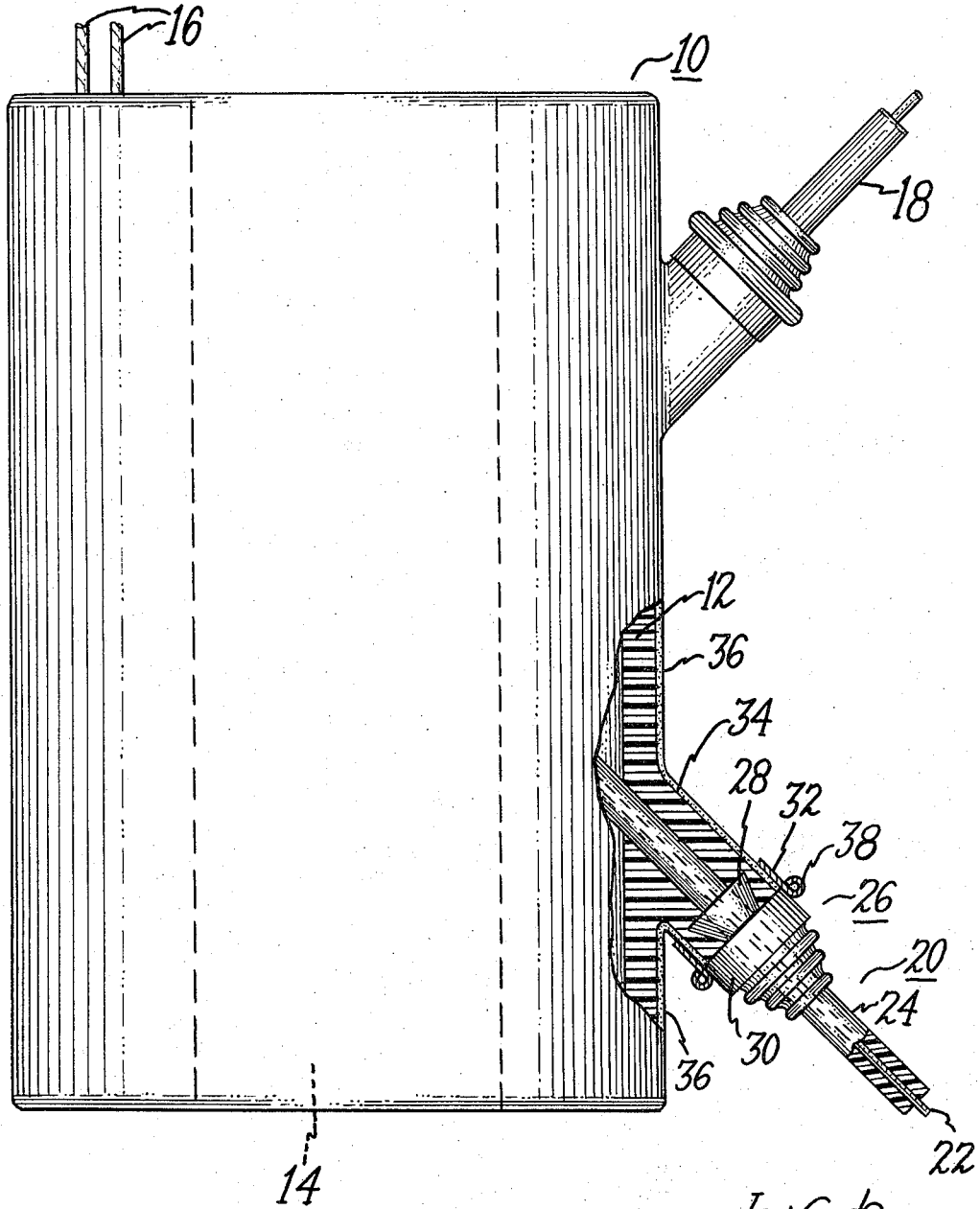

ABSTRACT OF THE DISCLOSURE

A sealed lead entrance for the electrical conductors of an encapsulated electrical apparatus. The lead entrance is an epoxy bushing molded to the insulation of the electrical conductor and provided with a key in the form of a truncated cone which is imbedded in the encapsulating material with the largest diameter of the cone farthest into the material. A high voltage shield termination is provided about the bushing in the form of a metal sleeve having a rounded outer edge. The metal sleeve is bonded to a grounded conductive coating on the surface of the encapsulated material.

---

This invention relates to encapsulated electrical devices and more particularly to the voltage lead entrances for encapsulated electrical devices.

As is well known to those skilled in the electrical art, particularly the art of electrical power distribution, much effort is being directed to reducing the size and weight of electrical devices, such as for example power distribution transformers. Presently a number of encapsulated electrical devices are being provided to the electric utility industry. One such encapsulated device is described and claimed in application Serial No. 114,747 for Encapsulated Coils for Electromagnetic Induction Devices and Method of Making Such Coils, which was filed June 5, 1961, in the names of B. V. Giegerich and E. K. Steele and assigned to the same assignee as this invention.

In encapsulated electrical apparatus a problem arises that is not present in apparatus encased in metal tanks. As is well known, with apparatus encased in metal tanks the voltage windings are usually connected to various types of bushing members mounted on such tanks with provisions for extending the lead into the interior of the tank. These bushing members provide for adequate sealing of the opening into the tank. However, in encapsulated apparatus which is enclosed in an electrical insulating resinous material a problem arises in adequately sealing the lead to the encapsulating material. It has been proposed to seal the lead to the encapsulating material by selecting material for both the lead insulation and the encapsulating material which will provide a bond between the lead insulation and the encapsulating material. This is generally considered undesirable since it imposes rather stringent limitations on either the encapsulating material, or the lead insulation, or both such insulations. Further, such sealing means do not provide sufficient strength to the lead entrance to prevent mechanical damage to the lead insulation or to the sealing thereof during the curing of the encapsulating material and the installation of the electrical apparatus.

It has also been proposed to use rubber type bushings at the entrance of the lead to the electrical apparatus, such bushings being vulcanized or otherwise bonded to the lead insulation. This type of bushing is considered undesirable since it is too flexible, allowing undue stress to be placed upon the lead and its connection to the winding during curing and subsequent installation of the electrical apparatus.

A further problem found, particularly with respect to the high voltage leads of encapsulated electrical apparatus is adequate termination of the shielding of the apparatus. In order to prevent undue radio interference voltage from the apparatus, shielding is provided. Such shielding must be terminated at the high voltage lead, and sharp termination edges must be eliminated to obtain a satisfactory voltage level.

It is therefore one object of this invention to provide a novel sealed lead entrance to an encapsulated apparatus.

A further object of this invention is to provide a novel sealed lead to an electrical apparatus in which an epoxy bushing is provided about the lead insulation and embedded in the encapsulating material of the electrical apparatus.

A still further object of this invention is to provide a novel sealed entrance lead to an encapsulated electrical apparatus in which an epoxy bushing is provided about the lead, the epoxy bushing being embedded in the encapsulating material and providing a shielded termination at the epoxy bushing, the shield being electrically connected to a grounded conductive shield on the surface of the encapsulating material.

Briefly, in one form this invention provides a lead entrance to an encapsulated electrical device. An epoxy bushing is molded or otherwise formed about the lead insulation and embedded in the encapsulating material. When the lead entrance is a high voltage lead a shield termination is provided at the epoxy bushing and electrically connected to the grounded conductor shield on the encapsulated device.

The invention sought to be protected in this application will be particularly pointed out and distinctly claimed in the claims appended hereto. However, it is believed that this invention and the manner in which its objects and advantages are obtained, as well as other objects and advantages thereof, will be better understood by reference to the following detailed description of a preferred embodiment thereof, particularly when considered with the accompanying drawing. The accompanying drawing is a single figure of a side elevation of an encapsulated coil unit, partly in section, incorporating a preferred embodiment of the invention.

Referring now to the drawing, this invention will be described with reference to an encapsulated coil similar to that disclosed and claimed in the aforementioned application Ser. No. 114,747. While the description references a particular type of encapsulated apparatus, it will of course be understood that such description is for illustrative purposes only and should not be considered as limiting the invention.

A preferred embodiment of this invention is shown as applied to an encapsulated coil unit 10 which includes a high voltage and low voltage winding (not shown) encapsulated in a resinous electrical insulating material 12, as more particularly set forth in application Ser. No. 114,747. As can be seen in the drawing, the encapsulated coil unit 10 is provided with an opening 14 extending therethrough. A core unit (not shown) may be electromagnetically connected to the encapsulating coil unit 10 through opening 14. The low voltage winding leads are shown as 16 and being brought out of the top of coil unit 10. The high voltage winding leads 18 and 20 are brought out of the sides of the coil 10 as shown. As will be understood, all of the winding leads may be similarly sealed to the encapsulated unit 10, therefor, only the sealing means for lead 20 will be described in detail.

As shown in the drawing, lead 20 comprises an electrical conductor 22 which extends into the encapsulated coil unit 10 and is connected to one side of the high voltage winding (not shown) in any desired manner. Conductor 22 is provided with an insulating covering 24 of any desired electrical insulating material. In the preferred embodiment insulation 24 is a hydrated alumina filled ethylene propylene terpolymer material which has desirable non-tracking properties, combined with outstanding corona and ozone resistance.

An epoxy bushing 26 is molded or otherwise secured to insulation 24 of lead 20. Epoxy bushing 26 is made of an epoxy resin which has a flexibilizer added so that its resiliency is intermediate that of the conductor insulation 24 and the encapsulating resinous material 12. In the preferred form of bushing 26, as shown in the drawing, the lower portion 28 is in the shape of a truncated cone, which is of a smaller diameter than the upper part 30 and is integral therewith. Thus portion 28 forms a key for bushing 26. Portion 28 is embedded directly in the encapsulating material 12. As will be apparent the cone shape of portion 28 will provide a secure mechanical attachment of bushing 26 to the encapsulated device 10. Also, as will be readily apparent, since the bushing 26 is molded directly to the insulation 24 of the lead 20, and since the truncated cone portion 28 is embedded directly in the encapsulant 12, a novel and secure seal will also be provided as the entrance to the electrical apparatus 10.

Where lead 20 is a high voltage lead of the encapsulated electrical apparatus 10, it is desirable to provide a shield termination about the bushing 26. As is shown in the drawing, a metal sleeve member 32 is provided about the lead entrance at the edge of upper portion 30 of epoxy bushing 26. Sleeve member 32 is preferably bonded to the lead entrance by means of a conductive coating on the encapsulating material 12. As indicated at 34, the conductive coating 34 is integral with a grounded conductive coating 36 on the surface of encapsulating material 12 which acts as a shield for the encapsulated apparatus 10. Since sleeve 32 acts as a termination for the shield 36, it is preferably provided with a rounded outer edge, as shown at 38. As will be understood rounded edge 38 permits a gradual change in the electrical field rather than a sharp change which could lead to undesirable radio noises. Of course, it will be understood that in some constructions a conductive coating could be brushed, sprayed or otherwise coated on the lead entrance in place of metal sleeve 32.

While there has been shown and described the present preferred embodiment of lead entrance to an encapsulated device in the manner required by the patent statutes, it will of course be understood that such description as has preceded is for illustrative purposes only. The invention, of course, is susceptible to many changes as will be obvious to those skilled in the art and such changes are encompassed by the invention insofar as they are within the terms of the following claims.

What is claimed as new and which it is desired to secure by Letters Patent of the United States is:

1. In an electrical apparatus including a high and low voltage winding encapsulated in an electrical insulating resinous material and having leads covered by electrical insulation extending from the high and low voltage windings to the exterior of the encapsulated apparatus an improved lead entrance which comprises:
    (a) an epoxy bushing formed about at least a high voltage lead,
        (1) said epoxy bushing being bonded to the electrical insulation covering said high voltage lead,
        (2) said epoxy bushing being formed with 2 integral portions,
            (a) one of said portions being in the form of a truncated cone with the smallest diameter of said truncated cone portion integral with the other portion of said bushing and with the largest diameter of said truncated cone being smaller than the diameter of said other portion of said bushing,
            (b) said truncated cone portion being imbedded in the encapsulating electrical insulating material with the largest diameter of said truncated cone portion located farthest into the encapsulated material whereby said truncated cone portion acts as a key to secure said epoxy bushing to the encapsulating material.

2. An electrical apparatus as claimed in claim 1 in which an electrostatic shield is provided on the surface of the electrical apparatus and an electrostatic shield termination is provided at said epoxy bushing, said shield termination being in the form of a metal sleeve surrounding said epoxy bushing and bonded to said electrostatic shield, said metal sleeve having a rounded outer edge to prevent sharp changes in the electrostatic field.

References Cited

UNITED STATES PATENTS

| | | | |
|---|---|---|---|
| 1,057,178 | 3/1913 | Sessions | 174—76 |
| 2,149,529 | 3/1937 | La Fave | 336—96 X |
| 2,311,128 | 2/1943 | Ranney | 336—96 X |
| 2,373,843 | 4/1945 | Nicholas | 174—73 |
| 3,041,561 | 6/1962 | Hannon et al. | 336—84 |
| 3,236,937 | 2/1966 | Harkness et al. | 336—96 X |

LARAMIE E. ASKIN, *Primary Examiner.*

T. J. KOZMA, *Assistant Examiner.*